US008661447B1

(12) United States Patent
Olliff et al.

(10) Patent No.: US 8,661,447 B1
(45) Date of Patent: Feb. 25, 2014

(54) METHOD AND APPARATUS FOR MANAGING EXECUTION OF A PLURALITY OF COMPUTER TASKS BASED ON AVAILABILITY OF COMPUTER RESOURCES

(75) Inventors: Michael Olliff, Canyon Country, CA (US); Petrus Johannes Viljoen, Redondo Beach, CA (US)

(73) Assignee: Symantec Corporation, Mountain View, CA (US)

( * ) Notice: Subject to any disclaimer, the term of this patent is extended or adjusted under 35 U.S.C. 154(b) by 938 days.

(21) Appl. No.: 12/409,467

(22) Filed: Mar. 23, 2009

(51) Int. Cl.
*G06F 9/455* (2006.01)
*G06F 9/46* (2006.01)

(52) U.S. Cl.
USPC .......................................... 718/104; 718/102

(58) Field of Classification Search
USPC ........................................................ 718/102
See application file for complete search history.

(56) References Cited

U.S. PATENT DOCUMENTS

| | | | | |
|---|---|---|---|---|
| 6,633,942 | B1 * | 10/2003 | Balasubramanian | 710/264 |
| 6,687,257 | B1 * | 2/2004 | Balasubramanian | 370/429 |
| 7,043,758 | B2 * | 5/2006 | Grupe | 726/24 |
| 7,440,973 | B2 * | 10/2008 | Tsukerman et al. | 1/1 |
| 7,885,222 | B2 * | 2/2011 | Cole | 370/328 |
| 2005/0015767 | A1 * | 1/2005 | Nash et al. | 718/102 |
| 2005/0278208 | A1 * | 12/2005 | Schultz | 705/8 |
| 2006/0026212 | A1 * | 2/2006 | Tsukerman et al. | 707/200 |
| 2007/0109592 | A1 * | 5/2007 | Parvathaneni et al. | 358/1.15 |
| 2008/0184241 | A1 * | 7/2008 | Headrick et al. | 718/102 |
| 2008/0215409 | A1 * | 9/2008 | Van Matre | 705/8 |
| 2008/0256238 | A1 * | 10/2008 | Hu et al. | 709/226 |
| 2009/0187908 | A1 * | 7/2009 | He et al. | 718/102 |
| 2011/0154353 | A1 * | 6/2011 | Theroux et al. | 718/104 |

OTHER PUBLICATIONS

Green, John, "Job Scheduling Software," Buyer's Guide, Windows 2000 Magazine, Nov. 2001, pp. 79-81.
msdn Task Scheduler (Windows), Copyright 2009 Microsoft Corporation. Downloaded from web site http://msdn.microsoft.com/en-us/library/aa383614(printer).aspx on Jun. 18, 2009.
Distributed Queueing System—3.3.2 User Guide, Dec. 12, 2000, Florida State University, Computational Science and Information Technology. Downloaded from web site http://www.csb.yale.edu/userguides/sysresource/batch/doc/UserGuide.html on Jun. 18, 2009.
Feitelson, Dror, "Parallel Computing Systems—Part III: Job Scheduling," Copyright 2003 Dror Feitelson.
Jones, James Patton et al., "Workload Management: More Than Just Job Scheduling," Proceedings of the 2001 IEEE International Conference on Cluster Computing (CLUSTER'01), pp. 113-115.

* cited by examiner

*Primary Examiner* — Meng An
*Assistant Examiner* — Bradley Teets
(74) *Attorney, Agent, or Firm* — Wilmer Cutler Pickering Hale and Dorr LLP

(57) ABSTRACT

A method and apparatus for managing execution of a plurality of computer tasks based on availability of computer resources is provided. In one embodiment, a method for managing execution of a plurality of computer tasks includes processing a schedule for executing the plurality of computer tasks, analyzing the schedule using dynamic timeout data to determine at least one overdue computer task of the plurality of computer tasks and modifying at least one resource requirement of the at least one overdue computer task of the plurality of computer tasks in accordance with the dynamic timeout data.

14 Claims, 3 Drawing Sheets

US 8,661,447 B1

METHOD AND APPARATUS FOR MANAGING EXECUTION OF A PLURALITY OF COMPUTER TASKS BASED ON AVAILABILITY OF COMPUTER RESOURCES

BACKGROUND

1. Field of the Invention

Embodiments of the present invention generally relate to computer resource management and, more particularly, to a method and apparatus for managing execution of a plurality of computer tasks based on availability of computer resources.

2. Description of the Related Art

Because of the progression of high performance computer systems, complex software programs evolved to consume a significant amount of computer resources (e.g., a CPU, a memory, and/or the like). Generally, software programs may execute various computer tasks as a foreground computer task and/or background computer task. For example, the security software programs execute one or more computer tasks (e.g., scanning a file while downloading, installing an update or a patch and/or the like) in a background, while a user interacts with other software programs (e.g., MS WORD, MS EXCEL and/or the like). However, each computer task requires a certain amount of the computer resources to execute properly and completely. As such, the background computer tasks may utilize approximately the same amount of the computer resources as the foreground tasks. Consequently, a response time of a user interaction with the other software programs may be delayed.

Occasionally, the background computer tasks of the software programs (e.g., the security software programs) may be suspended and/or delayed to enhance such a response time. However, such a suspension and/or delay may compromise proper functioning, security and/or the like of the computer system. For example, the security software program may suspend an important computer task (e.g., scanning the file while downloading that has malware attached to it). As a result, the security of the computer system is compromised. While in other instances, if the background computer tasks are executed as scheduled, then the response time of the user interaction is affected (i.e., delayed).

Currently, various software programs are employed to schedule computer tasks. Such computer task scheduling software programs execute the computer tasks at pre-defined (i.e., fixed) intervals. Further, the user may configure and schedule the tasks to be performed at a later time and/or a date. For example, the user may utilize a command (e.g., a UNIX command) to schedule the tasks. However, such computer task scheduling software programs fail to bind the execution of the computer tasks to availability of the computer resources. For example, a particular task may be executed even though each and every required resource is not available. As another example, the particular task may not be suspended in response to the removal of one or more critical computer resources. Hence, one or more resource requirements of the computer task cannot be dynamically modified.

Therefore, there is a need in the art for a method and apparatus for managing execution of a plurality of computer tasks based on availability of computer resources.

SUMMARY OF THE INVENTION

Embodiments of the present invention comprise a method and apparatus for managing execution of a plurality of computer tasks based on availability of computer resources. In one embodiment, a method for managing execution of a plurality of computer tasks comprises processing a schedule for executing the plurality of computer tasks, analyzing the schedule using dynamic timeout data to determine at least one overdue computer task of the plurality of computer tasks and modifying at least one resource requirement of the at least one overdue computer task of the plurality of computer tasks in accordance with the dynamic timeout data.

BRIEF DESCRIPTION OF THE DRAWINGS

So that the manner in which the above recited features of the present invention can be understood in detail, a more particular description of the invention, briefly summarized above, may be had by reference to embodiments, some of which are illustrated in the appended drawings. It is to be noted, however, that the appended drawings illustrate only typical embodiments of this invention and are therefore not to be considered limiting of its scope, for the invention may admit to other equally effective embodiments.

DETAILED DESCRIPTION

Figure 1:
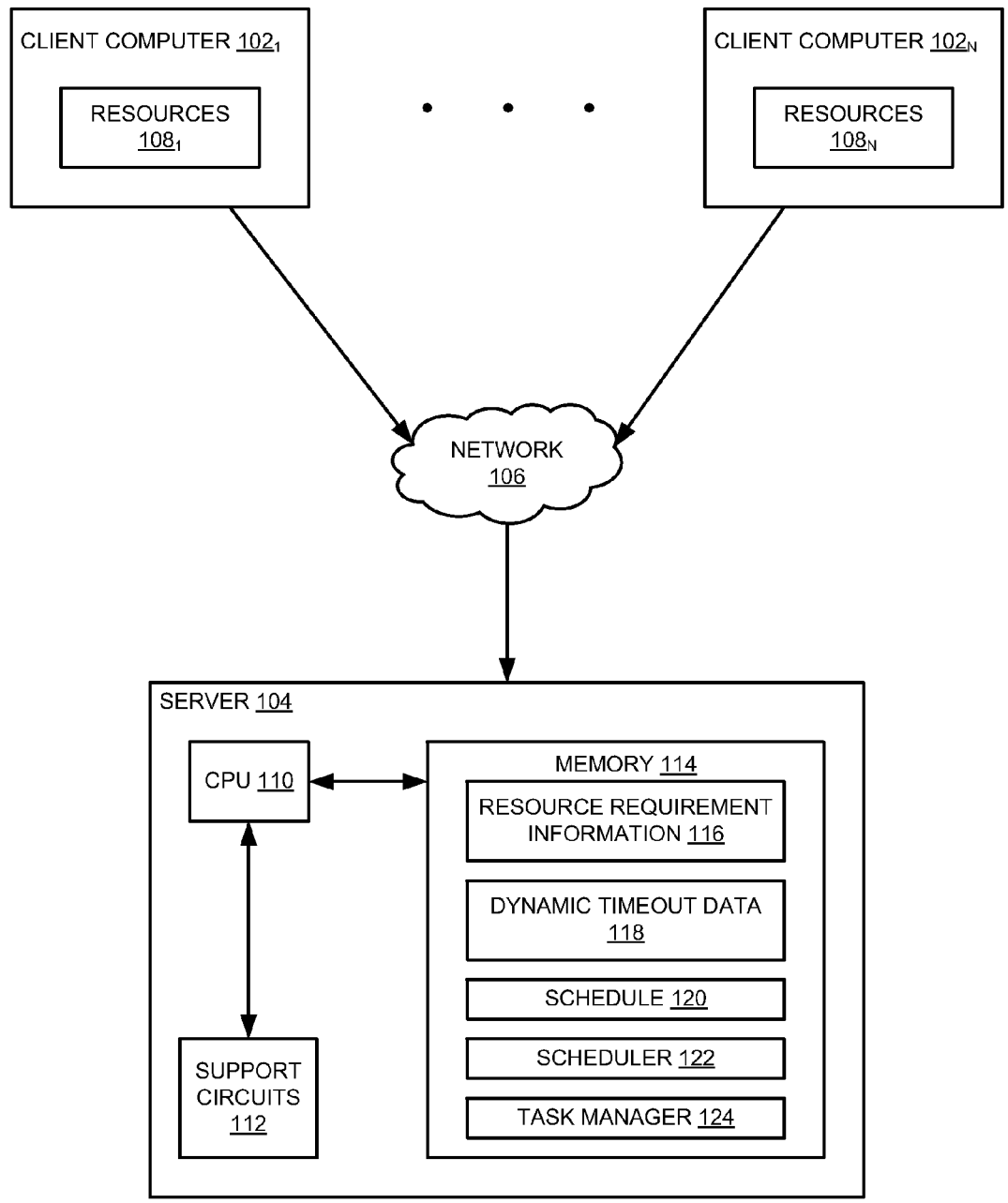
FIG. 1 is a block diagram of a system for managing execution of a plurality of computer tasks based on availability of computer resources according to various embodiments.

FIG. 1 is a block diagram of a system 100 for managing execution of a plurality of computer tasks according to various embodiments. The system 100 comprises a plurality of client computers 102 and a server 104, where each is coupled to each other through a network 106. The plurality of client computers 102 are illustrated as a client computer $102_1$ ... a client computer $102_N$.

The server 104 is a type of computing device (e.g., a laptop, a desktop, a Personal Digital Assistant (PDA) and/or the like), such as those generally known in the art. The server 104 includes a Central Processing Unit (CPU) 110, various support circuits 112 and a memory 114. The CPU 110 may comprise one or more commercially available microprocessors or microcontrollers that facilitate data processing and storage. The various support circuits 112 facilitate the operation of the CPU 110 and include one or more clock circuits, power supplies, cache, input/output circuits, and the like. The memory 114 comprises at least one of Read Only Memory (ROM), Random Access Memory (RAM), disk drive storage, optical storage, removable storage and/or the like. The memory 114 includes various data, such as resource requirement information 116, dynamic timeout data 118 and a schedule 120. Further, the memory 114 includes various software packages, such as a scheduler 122 and a task manager 124.

The network 106 comprises a communication system that connects computers by wire, cable, fiber optic and/or wireless link facilitated by various types of well-known network elements, such as hubs, switches, routers, and the like. The network 106 may employ various well-known protocols to communicate information amongst the network resources. For example, the network 106 may be a part of the internet or intranet using various communications infrastructure, such as Ethernet, WiFi, WiMax, General Packet Radio Service (GPRS), and the like. Furthermore, the network 106 may form a portion of a Storage Network Area (SAN) using various communications infrastructure, such as Ethernet, Fibre Channel, InfiniBand, Internet Small Computer System Interface (iSCSI) and the like.

Each client computer of the plurality of client computers 102 is a type of computing devices (e.g., a laptop, a desktop, a Personal Digital Assistant (PDA) and/or the like), such as those generally known in the art. According to various embodiments, the plurality of client computers 102 include a plurality of resources 108 (illustrated as resources $108_1$ . . . resources $108_N$). In one embodiment, the resources 108 include various hardware components (e.g., a CPU, a computer memory and/or the like) and software packages that operate within the plurality of client computers 102. According to various embodiments, the resources 108 provide information regarding available computer memory capacity, processor (CPU) availability, Hard Disk Drive (HDD) bandwidth, network availability, power source capacity and/or the like. Furthermore, the resources 108 indicate user availability as well as administrator availability. As shown below, the task manager 124 utilizes various portions of the resources 108 to execute one or more computer tasks in accordance with the schedule 120.

The resources 108 may be probed by various computer system components. For example, MICROSOFT Performance Data Helpers (PDH) may be used to assess availability and aggregate configuration data regarding the resources 108 (e.g., from various data stores and/or performance counters). As another example, the user and/or administrator availability is determined for any computer task that requires administrator and/or user attention and/or interaction. Further, the computer task may require to be executed in a privileged mode (i.e., administrative mode). The user and/or administrator availability may be determined through various techniques, such as detecting input from various devices (e.g., peripheral devices such as a mouse or keyboard), processing session events (e.g., log-on/log-off, lock/unlock or connect/disconnect) and/or the like.

Generally, the schedule 120 includes information regarding a plurality of computer tasks that are to be executed by the client computers 102. According to one or more embodiments, the schedule 120 indicates a scheduled execution time for each computer task of the plurality of computer tasks. As described further below, the task manager 124 accesses the schedule 120 and ascertains a time at which a particular computer task is scheduled to be executed. When the particular computer task is due, the task manager 124 executes the particular computer task if each and every resource requirement is satisfied. For example, the task manager 124 assesses availability of one or more critical resources before executing the particular computer task.

In one embodiment, the resource requirement information 116 includes mapping between various portions of the resources 108 and the plurality of computer tasks. Such mappings indicate various capacities of one or more computer resources that are required by each of the plurality of computer tasks for execution. The resource requirement information 116 may be pre-configured or pre-determined before the plurality of computer tasks are executed. Furthermore, the resource requirement information 116 may be adjusted dynamically when a particular computer task is not executed in accordance with the schedule 120. For example, one or more computer resource requirements are modified if the particular computer task is overdue.

According to various embodiments, the dynamic timeout data 118 indicates one or more timeout thresholds at which a plurality of computer tasks are to be executed. Each timeout threshold may define a specific time after a scheduled execution time of each computer task of the plurality of computer tasks. For example, a background task for a computer security software package (e.g., LiveUpdate for NORTON AntiVirus) having a scheduled execution time of noon each day requires a network connection to the Internet. The background task is further associated with two timeout thresholds of one hour each. As such, if the network is not available at noon, then the background task is now due and is to be executed as soon as the network becomes available before one (1) pm. Furthermore, if the network continues to be unavailable at one (1) pm, then the background task is now overdue and must be executed before two (2) pm. If a significant amount of time elapses after 2 pm, the background task is skipped entirely because network availability is a critical resource requirement for execution and cannot be dropped. In other words, the background task cannot be completed if the network is still unavailable.

In operation, the CPU 110 executes the scheduler 122 stored in the memory 114 to examine a plurality of computer tasks in order to identify one or more required resources of the resources 108 and generate the schedule 120. In one embodiment, the scheduler 122 may generate the dynamic timeout data 118 using pre-configured timeout thresholds that are associated with the plurality of computer tasks. Subsequently, the CPU 110 executes the task manager 124 stored in the memory 114 to process the schedule 120 and to execute the plurality of computer tasks in accordance with the schedule 120.

According to various embodiments, the scheduler 122 and the task manager 124 cooperate to execute a plurality of computer tasks. In one embodiment, the scheduler 122 generates the schedule 120. Then, the task manager 124 executes a plurality of computer tasks in accordance with the scheduler 120. Accordingly, the task manager 124 assesses availability of one or more resources that are required for executing each computer task of the plurality of computer tasks in order. If the task manger 124 determines that each and every resource requirement is not satisfied, the scheduler 122 analyzes the schedule 120 using the dynamic timeout data 118.

In one embodiment, the scheduler 122 includes software code that is configured to compare the schedule 120 with the dynamic timeout data 118 to determine one or more overdue computer tasks amongst a plurality of computer tasks. For example, the scheduler 122 compares each time threshold of the plurality of computer tasks with a system clock to identify the one or more overdue computer tasks. As explained further below, one or more resource requirements may be dropped and/or modified in order to hasten execution of the one or more overdue computer tasks. For example, the scheduler 122 may drop one or more non-critical and unavailable resources in order to ensure execution of a particular computer task before an upcoming timeout threshold.

During computer task execution, the one or more computer tasks are executed only if the one or more required resources are available. For example, the one or more computer tasks may be stopped or skipped due to non-availability of a required computer resource (e.g., an insufficient capacity, a software fault, a hardware failure and/or the like). The non-available resource may be critical for execution (e.g., a network connection to storage devices). On the other hand, the non-available resource may be non-critical (e.g., fifty megabytes of storage space when only ten megabytes is needed).

Because of non-availability of one or more required computer resources, a particular computer task may fail to execute before a scheduled execution time according to one or more embodiments. In other words, the particular computer task is due but unable to be executed. In response, the scheduler 122 modifies the one or more required computer resources to hasten execution of the particular computer task. Furthermore, the scheduler 122 may increase a priority of the particular computer task. In one embodiment, the scheduler 122 may skip the execution of the one or more computer tasks that is not executed between the scheduled execution time and a time threshold.

According to various embodiments, the scheduler 122 accesses the resource requirement information 116 and modifies various resource mappings between the resources 108 and one or more computer tasks to achieve a higher probability of execution. For example, a particular computer task may not be allocated a required capacity of one or more required resources, such as processor cycles, network bandwidth and/or computer memory, because such computer resources are being used for another computer task (e.g., a user interactive computer task). As such, the scheduler 122 examines the dynamic timeout data 118 and modifies the resource requirement information 116 to facilitate execution of the particular computer task by utilizing an available capacity of one or more required resources instead of waiting for each and every resource requirement to be satisfied.

According to one or more embodiments, the scheduler 122 adjusts the schedule 120 in response to the one or more overdue computer tasks. For example, the scheduler 122 reschedules the one or more overdue computer tasks. In one embodiment, the scheduler 122 removes the one or more overdue computer tasks from the schedule 120. In another embodiment, the scheduler 122 adjusts one or more resource requirements as described above. For instance, the scheduler 122 identifies a non-critical resource requirement that is omitted during execution. Alternatively, the scheduler 122 may adjust (e.g., increase) a priority that is associated with a particular overdue task of the one or more overdue tasks in order to hasten execution.

According to one or more embodiment, the scheduler 122 may generate the dynamic timeout data 118 based on a wall clock or a system clock. In one or more embodiments, a system clock utilized by the server 104 may change before one or more computer tasks are executed. As such, the scheduler 122 adjusts various timeout thresholds associated with the one or more computer tasks. For example, the scheduler 122 may adjust to a new system clock by adding or subtracting any time difference to the various timeout thresholds within the dynamic timeout data 118.

Figure 2:
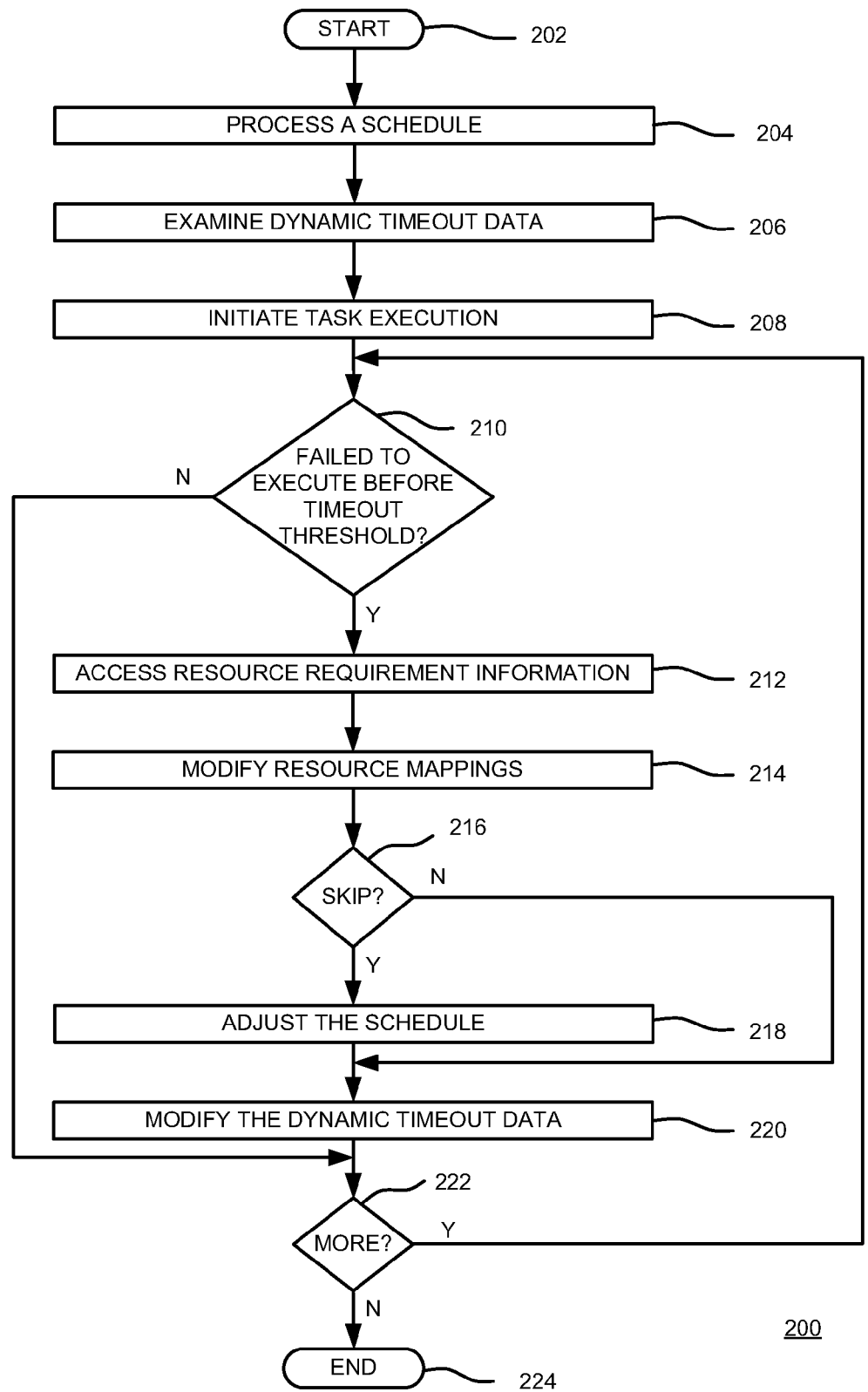
FIG. 2 is a flow diagram of a method for modifying resource mappings for an overdue computer task to hasten execution according to various embodiments.

FIG. 2 is a flow diagram of a method 200 for modifying resource mappings in response to an overdue computer task to hasten execution according to one embodiment. The method 200 starts at step 202 and proceeds to step 204, at which a schedule (e.g., the schedule 120 of FIG. 1) is processed. At step 206, a dynamic timeout data (e.g., the dynamic timeout data 118 of FIG. 1) is examined. At step 208, task execution is initiated. In one embodiment, a scheduler instructs a task manager to execute a plurality of computer tasks in accordance with the schedule. At step 210, a determination is made as to whether a computer task failed to execute before a timeout threshold. If, it is determined that the computer task was executed before the timeout threshold (option "NO') then the method 200 proceeds to step 222.

If, at step 210, it is determined that the computer task failed to execute before the timeout threshold (option "YES") then the method 200 proceeds to step 212. As described above, the computer task is determined to be overdue. At step 212, resource requirement information (e.g., the resource requirement information 116 of FIG. 1) is accessed. At step 214, various resource mappings are modified in order to hasten execution of the overdue computer task. At step 216, a determination is made as to whether the overdue computer task is to be skipped. If, it is determined that the overdue computer task is not to be skipped (option "NO") then the method 200 proceeds to step 220.

If, at step 216, it is determined that the overdue computer task is to be skipped (option "YES") then the method 200 proceeds to step 218. At step 218, the schedule is adjusted. At step 220, the dynamic timeout data is modified. In one embodiment, the timeout threshold is removed and the computer task is no longer overdue. Thus, the computer task resumes normal resource requirements and utilizes a new scheduled execution time. The method 200 proceeds to step 222, at which a determination is made as to whether there are more computer tasks to be executed. If, it is determined that there are more computer tasks to be executed (option "YES") then the method 200 proceeds to step 210. If, at step 222, it is determined that there are no more computer tasks to be executed (option "NO") then the method 200 proceeds to step 224. At step 224, the method 200 ends.

Figure 3:
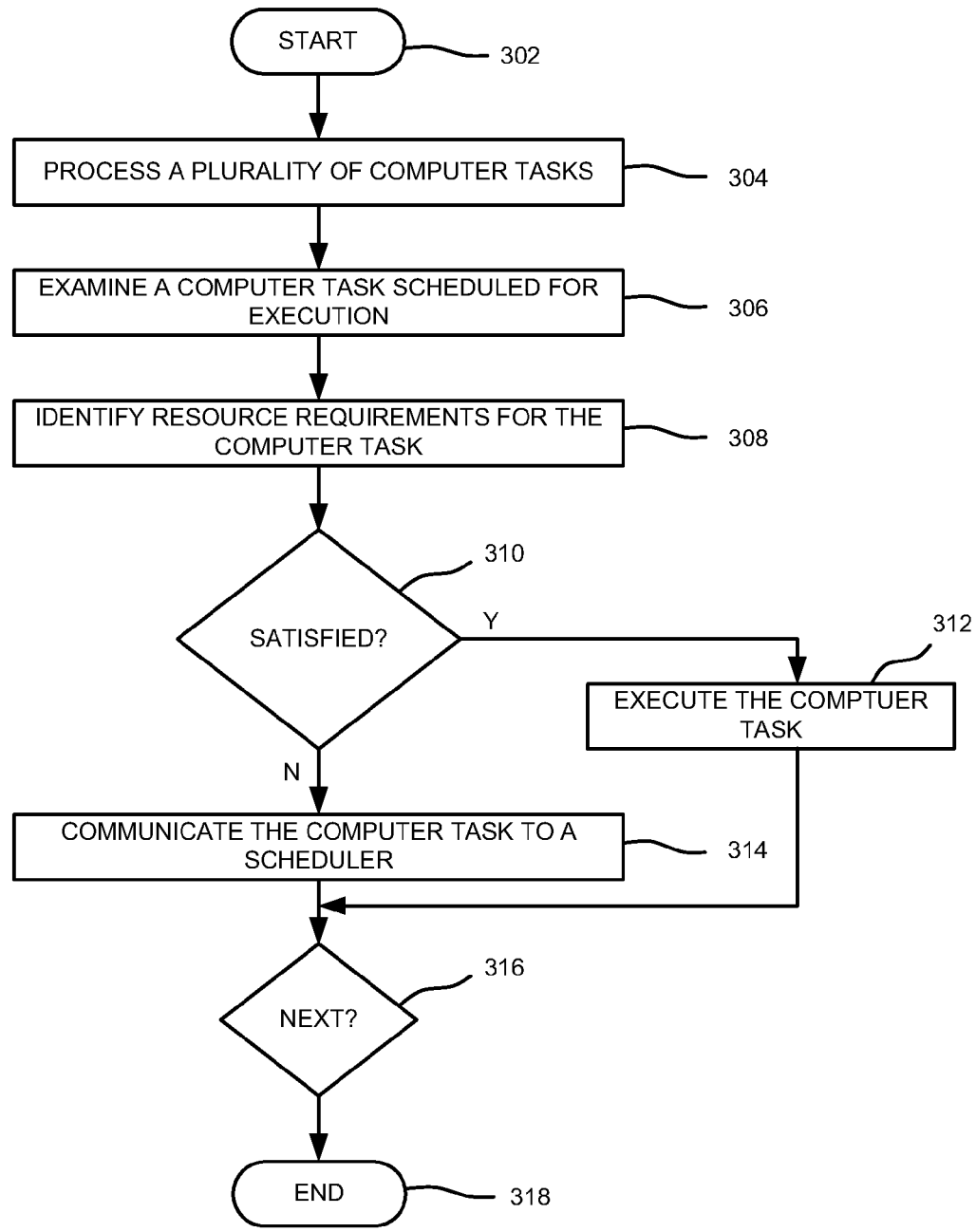
FIG. 3 is a flow diagram of a method for executing a plurality computer tasks in accordance with a schedule according to various embodiments.

FIG. 3 is a flow diagram of a method 300 for executing a plurality of computer tasks in accordance with a schedule according to one embodiment. The method 300 starts at step 302 and proceeds to step 304, at which a plurality of computer tasks is processed. At step 306, a computer task that is scheduled for execution is examined. For example, a scheduled execution time exceeds a wall clock or a system clock and therefore, the computer task is due. At step 308, resource requirements for the computer task are identified.

At step 310, a determination is made as to whether the resource requirements are satisfied. If, it is determined that the resource requirements are satisfied (option "YES"), then the method 300 proceeds to step 312. At step 312, the computer task is executed. If, at step 310, it is determined that the resource requirements are not satisfied (option "NO") then the method 300 proceeds to step 314. At step 314, the computer task is communicated to a scheduler for analysis. In one embodiment, the scheduler adjusts a schedule for the plurality of computer tasks based on dynamic timeout data. For example, the computer task is rescheduled for execution at a later time. As another example, the resource requirements are modified in order to ensure execution of the computer task. As shown above, a non-critical resource requirement may be adjusted and/or omitted during execution of the computer task. At step 316, a determination is made as to whether there is a next computer task based on a schedule. If, it is determined that the there is a next computer task (option "YES"), then the method 300 returns to step 306. If, it is determined that the resource requirements are no more computer tasks (option "YES"), then the method 300 proceeds to step 318. At step 318, where the method 300 ends.

While the foregoing is directed to embodiments of the present invention, other and further embodiments of the invention may be devised without departing from the basic scope thereof, and the scope thereof is determined by the claims that follow.

The invention claimed is:

1. A method for managing execution of a plurality of computer tasks, comprising:
   processing a schedule for executing the plurality of computer tasks;
   analyzing the schedule using dynamic timeout data, wherein the dynamic timeout data includes at least one timeout threshold associated with the plurality of computer tasks;

determining at least one overdue computer task of the plurality of computer tasks by comparing the at least one timeout threshold with a clock to identify the at least one overdue computer task;

determining at least one non-critical resource requirement of the at least one overdue computer task by mapping a plurality of monitored resources to the plurality of computer tasks to determine the at least one non-critical resource requirement;

modifying the at least one non-critical resource requirement of the at least one overdue computer task; and modifying the dynamic timeout data to include at least one new timeout threshold associated with the at least one overdue computer task.

2. The method of claim 1, further comprising adjusting the schedule to remove the at least one overdue computer task.

3. The method of claim 1, further comprising rescheduling the at least one overdue computer task.

4. The method of claim 1, wherein the at least one non-critical resource requirement is based on at least one capacity.

5. The method of claim 1, further comprising identifying a computer task of the at least one overdue computer task to be skipped during computer task execution based on the dynamic timeout data.

6. The method of claim 1, further comprising adjusting each priority associated with the at least one overdue computer task of the plurality of computer tasks.

7. The method of claim 1 further comprising omitting the at least one non-critical resource requirement during execution of the at least one overdue computer task.

8. The method of claim 1, wherein the at least one overdue task is executed in response to the at least one modified non-critical resource requirement.

9. The method of claim 1, further comprising assessing an availability of the at least one modified non-critical resource requirement.

10. An apparatus having at least one non-transitory processor readable storage medium storing a computer program of instructions for managing execution of a plurality of computer tasks, wherein the instructions cause at least one processor to:

analyze a schedule for executing a plurality of computer tasks using dynamic timeout data, wherein the dynamic timeout data includes at least one timeout threshold associated with the plurality of computer tasks;

determine at least one overdue computer task of the plurality of computer tasks by comparing the at least one timeout threshold with a clock to identify the at least one overdue computer task;

determine at least one non-critical resource requirement of the at least one overdue computer task by mapping a plurality of monitored resources to the plurality of computer tasks to determine the at least one non-critical resource requirement;

modify the at least one non-critical resource requirement of the at least one overdue computer task; and modify the dynamic timeout data to include at least one new timeout threshold associated with the at least one overdue computer task.

11. The apparatus of claim 10 wherein the instructions further cause the at least one processor to execute the at least one overdue task upon satisfaction of the at least one modified non-critical resource requirement.

12. The apparatus of claim 11, wherein the instructions further cause the at least one processor to identify a computer task of the at least one overdue computer task to be skipped during computer task execution based on the dynamic timeout data.

13. A system for managing execution of a plurality of computer tasks, comprising:

a plurality of client computers comprising a plurality of resources; and a server coupled to the plurality of client computers, comprising:

a scheduler for analyzing a schedule for executing a plurality of computer tasks using dynamic timeout data, wherein the dynamic timeout data includes at least one timeout threshold associated with the plurality of computer tasks, determining at least one overdue computer task of the plurality of computer tasks by comparing the at least one timeout threshold with a clock to identify the at least one overdue computer task, determining non-critical resource requirement information associated with the at least one overdue computer task, modifying the non-critical resource requirement information, and modifying the dynamic timeout data to include at least one new timeout threshold associated with the at least one overdue computer task; and a task manager for processing the schedule and executing the plurality of computer tasks in accordance with the non-critical resource requirement information.

14. The system of claim 13, wherein the scheduler reschedules the at least one overdue computer task.

* * * * *